US007921127B2

(12) United States Patent
Isoda

(10) Patent No.: US 7,921,127 B2
(45) Date of Patent: Apr. 5, 2011

(54) FILE MANAGEMENT APPARATUS, CONTROL METHOD THEREFOR, COMPUTER PROGRAM, AND COMPUTER-READABLE STORAGE MEDIUM

(75) Inventor: Takashi Isoda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 11/446,235

(22) Filed: Jun. 5, 2006

(65) Prior Publication Data
US 2006/0282417 A1  Dec. 14, 2006

(30) Foreign Application Priority Data

Jun. 13, 2005 (JP) .................................. 2005-172964

(51) Int. Cl.
G06F 7/00 (2006.01)
(52) U.S. Cl. ....................................... 707/758; 715/763
(58) Field of Classification Search ............... 707/104.1, 707/3–5, 731, 999.003, 758
See application file for complete search history.

(56) References Cited

U.S. PATENT DOCUMENTS

| 5,819,103 | A  | * | 10/1998 | Endoh et al. .................... 710/1 |
| 6,335,742 | B1 | * | 1/2002  | Takemoto ...................... 715/781 |
| 7,054,904 | B2 | * | 5/2006  | Ludwig et al. ................. 709/205 |
| 7,296,242 | B2 | * | 11/2007 | Agata et al. .................... 715/793 |
| 2001/0056434 | A1 | * | 12/2001 | Kaplan et al. ................. 707/104.1 |
| 2002/0054158 | A1 | * | 5/2002  | Asami ............................ 345/838 |
| 2002/0060955 | A1 | * | 5/2002  | Kumagai .................... 369/30.05 |
| 2002/0188461 | A1 | * | 12/2002 | Matsumoto ....................... 705/1 |
| 2004/0220899 | A1 | * | 11/2004 | Barney et al. ..................... 707/1 |
| 2005/0052550 | A1 | * | 3/2005  | Sato ............................ 348/231.2 |
| 2005/0076008 | A1 | * | 4/2005  | Kudou ............................. 707/3 |
| 2006/0031263 | A1 | * | 2/2006  | Arrouye et al. ............... 707/200 |
| 2006/0069998 | A1 | * | 3/2006  | Artman et al. ................. 715/721 |
| 2006/0129933 | A1 | * | 6/2006  | Land et al. .................... 715/723 |
| 2006/0159109 | A1 | * | 7/2006  | Lamkin et al. ................ 370/401 |
| 2007/0005581 | A1 | * | 1/2007  | Arrouye et al. ................... 707/4 |
| 2008/0022290 | A1 | * | 1/2008  | Ochiai et al. .................. 719/315 |
| 2008/0201307 | A1 | * | 8/2008  | Swartz ............................. 707/3 |

FOREIGN PATENT DOCUMENTS
JP            5-11968         1/1993
JP         2005025413 A        1/2005

* cited by examiner

Primary Examiner — Luke S. Wassum
Assistant Examiner — Mohammed R Uddin
(74) Attorney, Agent, or Firm — Fitzpatrick, Cella, Harper & Scinto

(57) ABSTRACT

This invention allows a user to play back desired information even in the form of an icon indicating a file, check the contents of the file, and open the file. The invention stores, in a search attribute file written in a structured format, location information indicating the location of a management target file, search item information used for searching, icon image for brief display created from the target file, and brief playback information for brief playback of a desired portion in the target file. When search key is input, a search attribute file matching the key is searched so that the attribute file is displayed as an icon based on icon image in the file. When right-clicking a desired icon, brief playback information in the attribute file is played back. When left-clicking the icon, the target file is opened according to location information in the attribute file.

10 Claims, 14 Drawing Sheets

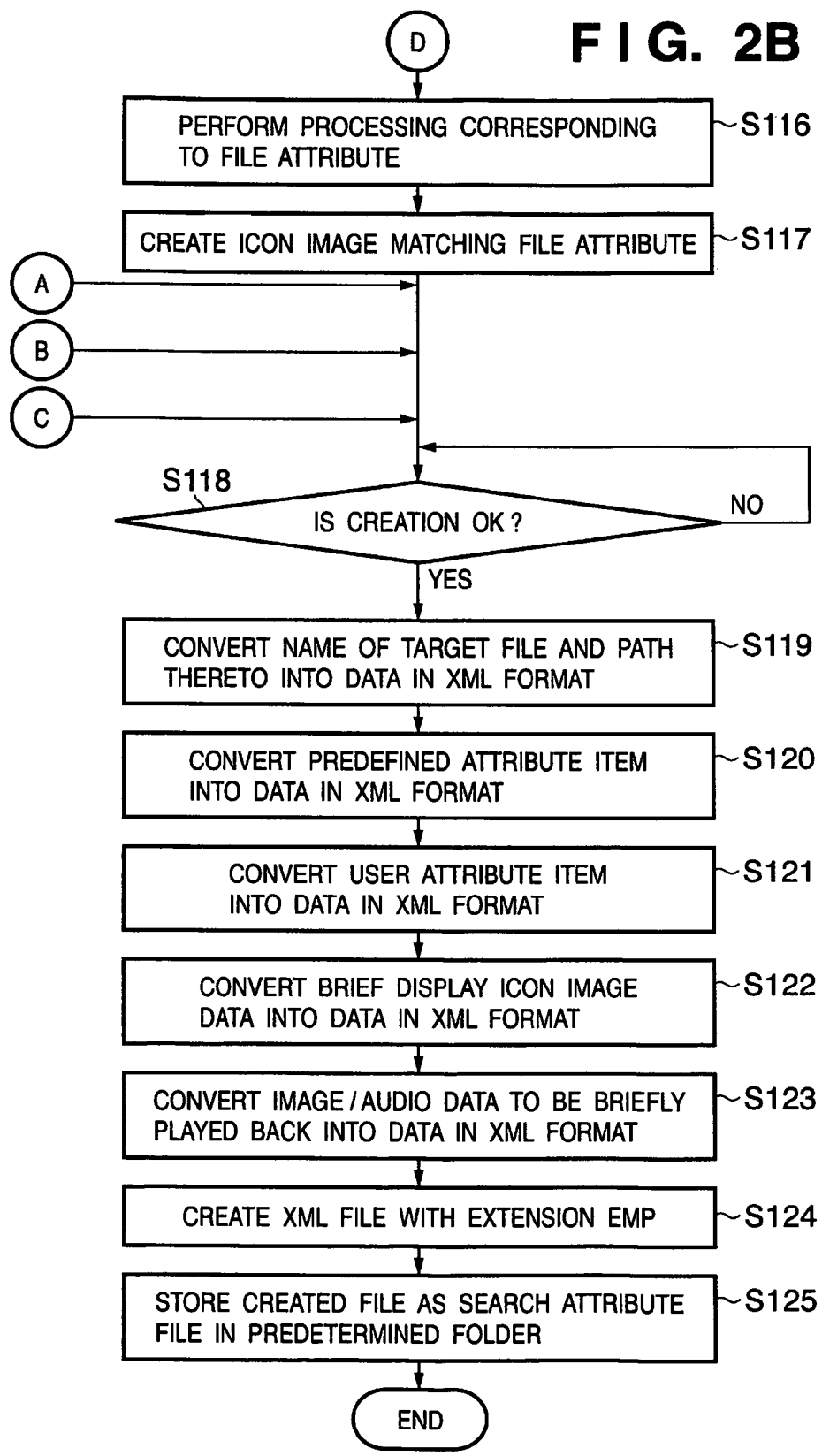

FIG. 3A

IN CASE OF AUDIO FILE

```
<BRIEF DISPLAY>
    <LINK FILE>c:¥work¥example.avc</LINK FILE>
    <ATTRIBUTE>
        <USER>ISODA</USER>
        <VERSION>1.2</VERSION>
        <FORMAT>AUDIO</FORMAT>
        <UPDATE DATE>2004/12/02</UPDATE DATE>
    </ATTRIBUTE>
    <WINDOW DISPLAY>
        WINDOW DISPLAY DATA SUBJECTED BRIEF DISPLAY (DISPLAY DATA OF ICON)
    </WINDOW DISPLAY>
    <BRIEF DISPLAY DATA>
        ACTUAL AUDIO DATA (EXTRACTED FROM ORIGINAL FILE)
    </BRIEF DISPLAY DATA>
</BRIEF DISPLAY>
```

FIG. 3B

IN CASE OF DOCUMENT FILE

```
<BRIEF DISPLAY>
    <LINK FILE>c:¥work¥example.avc</LINK FILE>
    <ATTRIBUTE>
        <USER>ISODA</USER>
        <GROUP>STPGA</GROUP>
        <VERSION>1.2</VERSION>
        <FORMAT>DOCUMENT</FORMAT>
        <CREATION DATE>2004/12/02</CREATION DATE>
        <CLASSIFICATION>ORGANIZATION CHART</CLASSIFICATION>
    </ATTRIBUTE>
    <WINDOW DISPLAY>
        WINDOW DISPLAY DATA SUBJECTED BRIEF DISPLAY (DISPLAY DATA OF ICON)
    </WINDOW DISPLAY>
    <BRIEF DISPLAY DATA>
        TEXT DATA SUBJECTED BRIEF DISPLAY (EXTRACTED FROM ORIGINAL FILE)
    </BRIEF DISPLAY DATA>
</BRIEF DISPLAY>
```

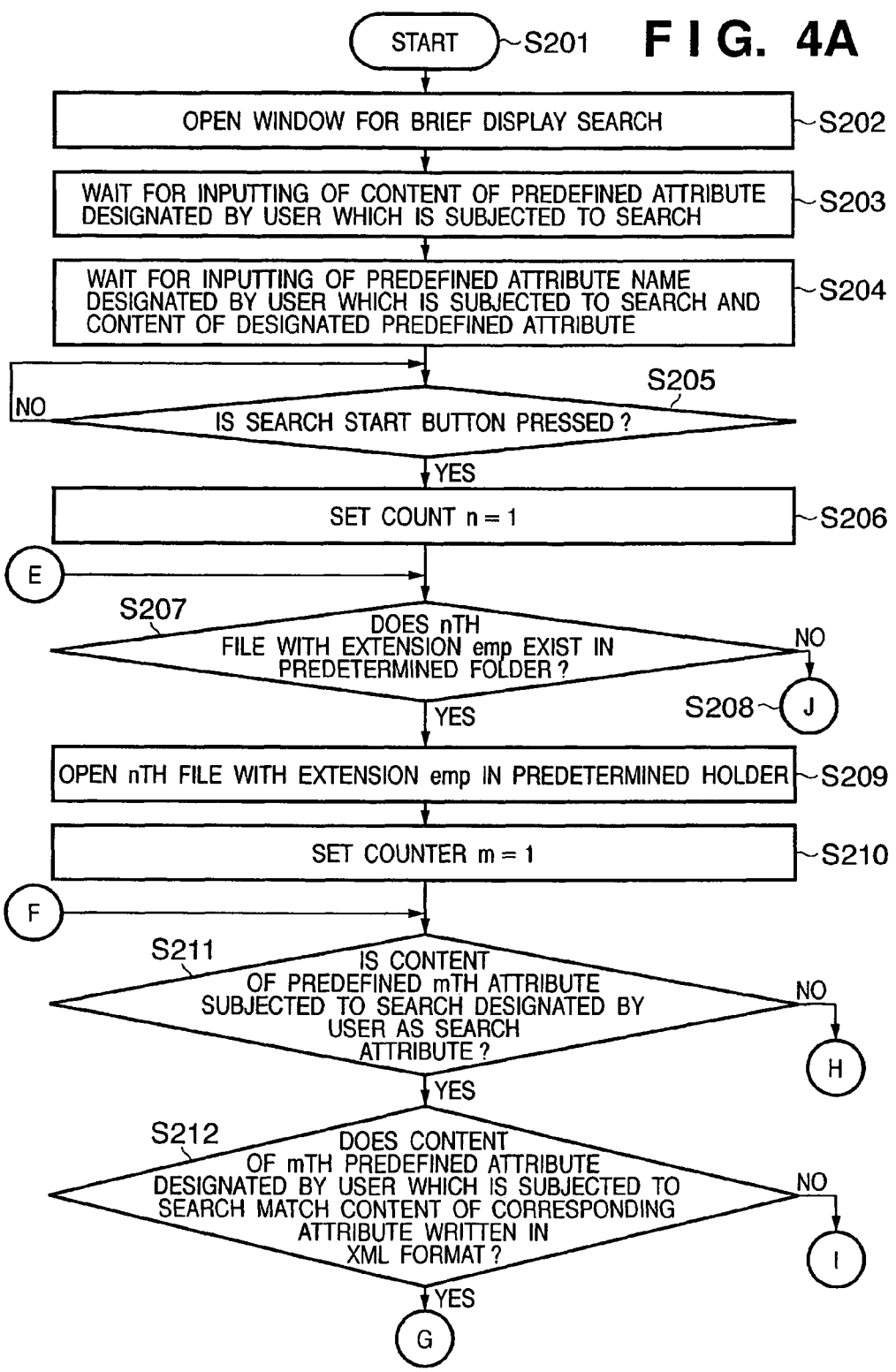

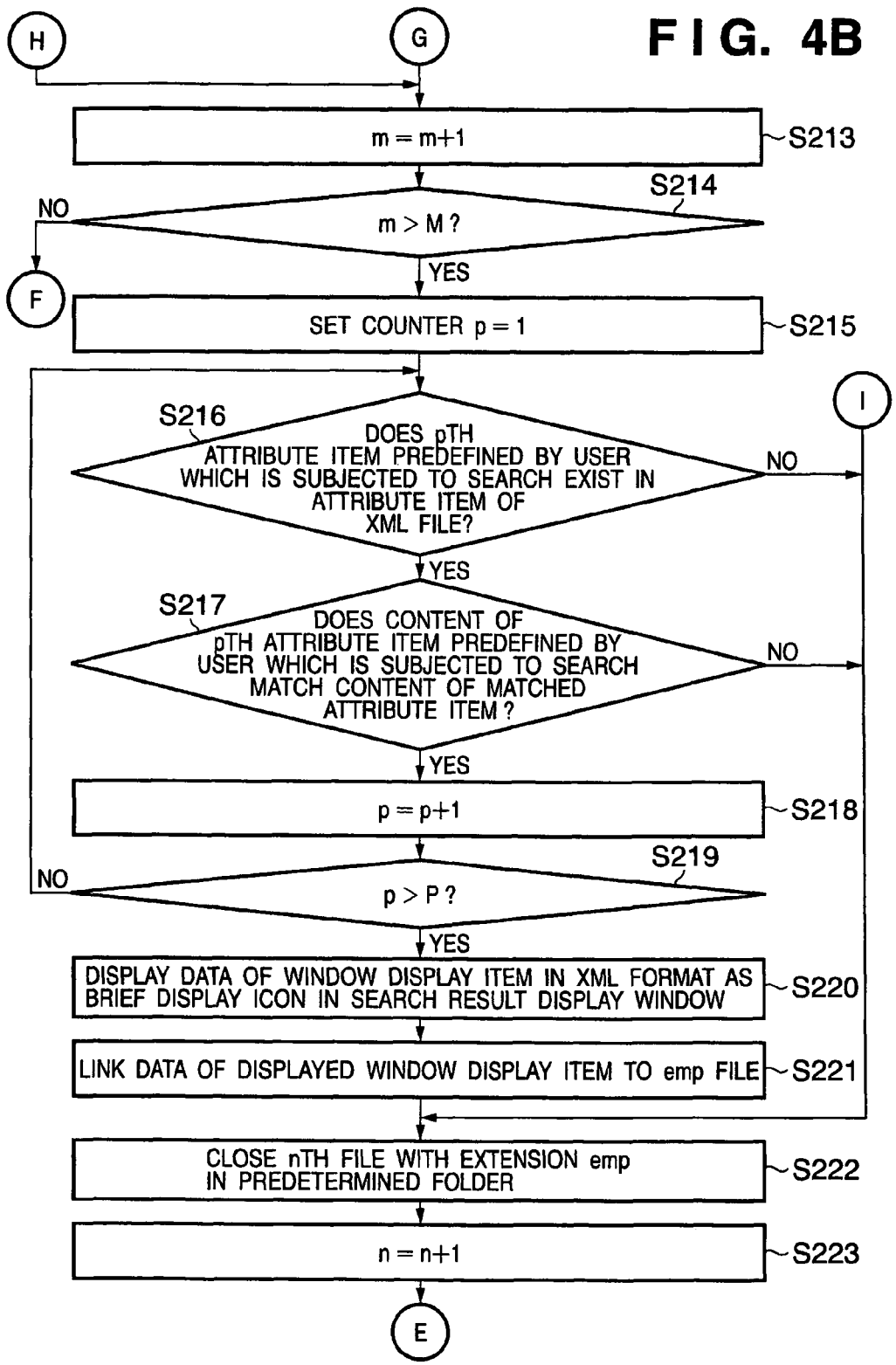

EXAMPLE OF SEARCH RESULTS OF BRIEF DISPLAY

FILE MANAGEMENT APPARATUS, CONTROL METHOD THEREFOR, COMPUTER PROGRAM, AND COMPUTER-READABLE STORAGE MEDIUM

FIELD OF THE INVENTION

The present invention relates to a management technique for electronic files.

BACKGROUND OF THE INVENTION

When electronic files stored in a storage device are to be displayed, a list of file names is generally displayed. Such a list has been displayed in file name order, size order, creation/update date order, or the like.

If, however, a user cannot identify a target file with its name or the like, he/she needs to open each file by using an application and check the contents of the respective files one by one. That is, it takes much time to perform search.

In consideration of such points, a brief display technique called the thumbnail technique has recently been realized. This technique is designed to reduce images stored as image files into icons and display them, thereby informing the user what kinds of image files are stored. Since thumbnails are sufficiently smaller than the original images, the thumbnails of many files can be displayed in a window. This allows the user to easily search for a target image.

According to the conventional thumbnail display techniques, however, only one thumbnail image is often displayed for one image file. That is, according to the current thumbnail display techniques, a form in which one image file includes a plurality of thumbnail images is not conceivable.

As an icon display technique, Japanese Patent Laid-Open No. 05-11968 discloses a technique of setting a plurality of icon fonts for one object and sequentially changing/displaying the icon fonts in accordance with mouse operation by a user.

The following problems, however, arise in the conventional techniques.

The above thumbnail display technique can display only a file having one image, but is not assumed to display a file having a plurality of thumbnail images. In addition, the icon display technique disclosed in Japanese Patent Laid-Open No. 05-11968 is designed to sequentially switch and display icons, and allows only one form in which icon fonts are simultaneously displayed.

SUMMARY OF THE INVENTION

The present invention is designed to create a plurality of thumbnails (or a plurality of brief playback information) for one file. If a plurality of thumbnails are created for each image, the created thumbnails become too large in number. If all the thumbnails are displayed as a result of file search, the displayed thumbnails become too large in number. This may make it difficult for the user to find a desired file.

Assume that the number of thumbnails which can be registered for one image file is limited. In this case, however, when a plurality of users are to use the files, there is a chance that one of a plurality of images which makes the strongest impression on each user will not become a thumbnail. In this case, it is not easy for each user to find an image file from thumbnails detected by file search.

For files other than image files, e.g., document files, audio files, moving picture files, and multimedia files each having a plurality of media such as a document, image, and moving picture in one file, a brief playback method may be used (e.g. the brief playback method displays/plays back pre-designated part of a document file, plays back audio data in a pre-designated interval of an audio file, and/or plays back a moving picture in a pre-designated interval of a moving picture file). If, however, a plurality of pieces of information subjected to brief playback are created for one file, brief playback data as output targets become too large in number. This may make it difficult for the user to find a desired file from the displayed brief playback data as a result of file search. On the other hand, assume that the number of pieces of brief playback information for one file is limited. In this case, when a plurality of users are to use the file, there is a chance that part of the file, of a plurality of document pages subjected to brief playback, data in a plurality of intervals of the audio file, or data in a plurality intervals of the moving picture file, which makes the strongest impression on each user will not be briefly displayed. In this case, it may not be easy for each user to find a desired file from the pieces of brief display information detected by file search.

The present invention has been made in consideration of such a problem, and has as its object to, when a file under management is searched, allow brief playback (brief output) of the contents of the file in a plurality of forms (a plurality of thumbnails and the like). It is another object of the present invention to perform proper output operation by using information of each user. It is still another object of the present invention to open the file as needed.

In order to solve this problem, for example, a file management apparatus of the present invention comprises the following arrangement.

There is provided a file management apparatus which manages a management target file stored in a storage device, comprising storage means for storing search information used for search of the management target file and brief playback information for brief playback of a desired portion of the management target file in association with each other, search means for searching search information stored in the storage means on the basis of a desired search key, and playback means for playing back brief playback information associated with search information searched by the search means, wherein the storage means can store a plurality of different pieces of search information and brief playback information in association with each other with respect to one management target file on the basis of an instruction from a user, and when a plurality of pieces of search information are searched by the search means, the playback means plays back pieces of brief playback information respectively associated with the plurality of pieces of searched search information.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 2A and 2B are flowcharts showing a sequence of creating a brief display attribute file in the embodiment;

FIGS. 3A and 3B are views each showing an example of the file structure of a brief display attribute file in the embodiment;

FIGS. 4A and 4B are flowcharts showing a search processing sequence in the embodiment;

DETAILED DESCRIPTION OF THE PREFERRED EMBODIMENTS

An embodiment of the present invention will be described in detail below with reference to the accompanying drawings.

Figure 1:
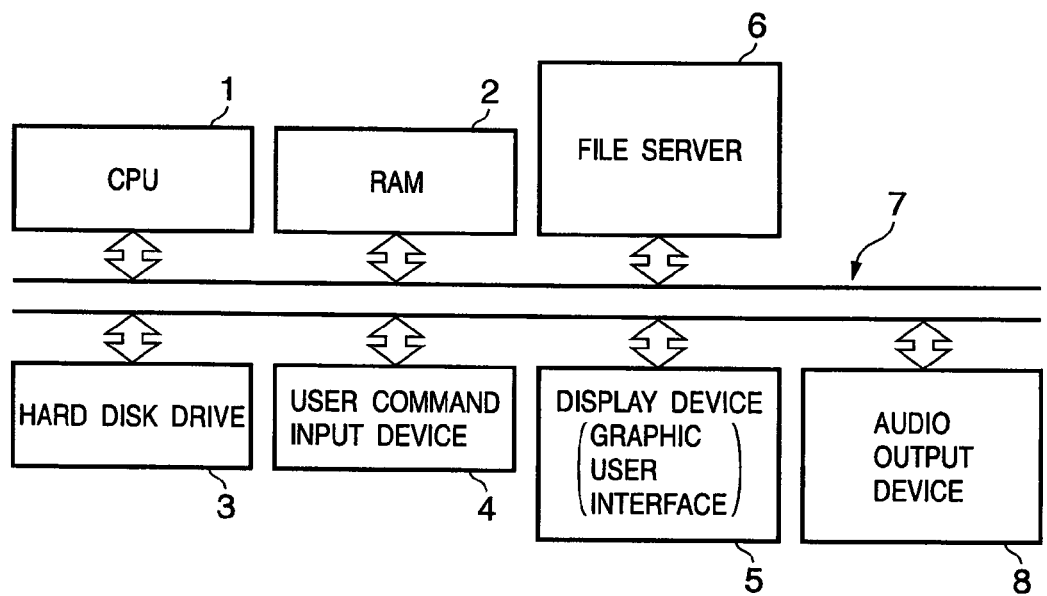
FIG. 1 is a block diagram showing the arrangement of an apparatus according to an embodiment.

FIG. 1 is a block diagram showing the arrangement of a file management apparatus. Referring to FIG. 1, reference numeral 1 denotes a CPU which controls the overall apparatus; 2, a RAM which provides a work area for the CPU 1; 3, a hard disk drive as a large-capacity storage device which stores an OS and programs associated with the embodiment; 4, a user command input device (a keyboard and a pointing device) with which the user makes various settings through a GUI (Graphic User Interface); 5, a display device which displays the GUI (Graphic User Interface): 6, file server in which files are stored; 7, a main bus; and 8, an audio output device which outputs audio data.

Note that in this embodiment, unless otherwise specified, in the file management. apparatus, the CPU 1 controls the RAM 2, hard disk drive 3, user command input device 4, display device 5, and file server 6 through the main bus 7. In this case, the hard disk drive 3 and the file server 6 will be described as discrete blocks. However, they can be implemented as a single block.

Figure 2A:
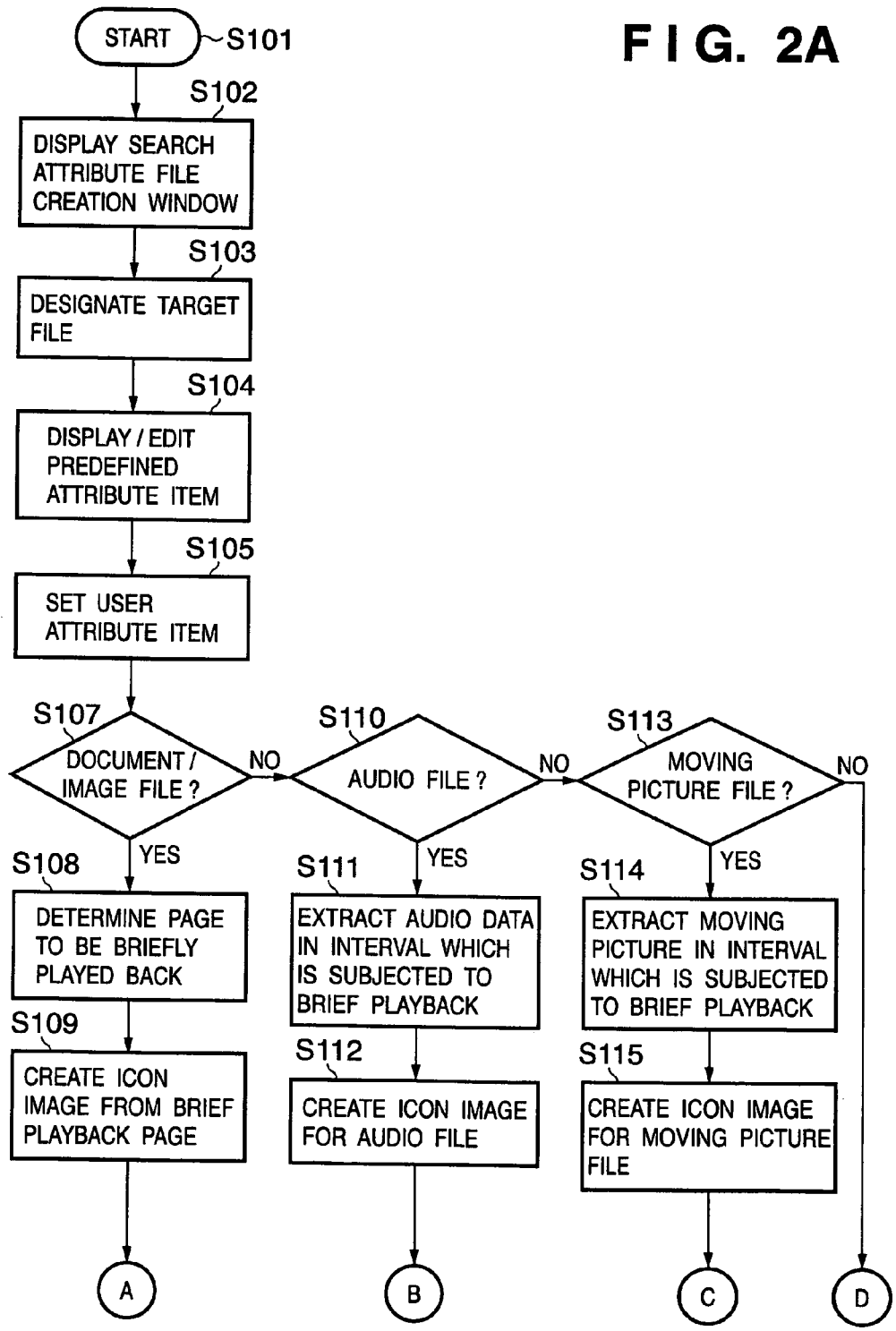

The manner of creating an attribute file for brief display (brief reproduction) according to an embodiment will be described first in detail with reference to FIGS. 2A and 2B. Assume that various files are stored in the file server 6 in advance. A method of storing files in the file server 6 is not very relevant to the present invention, and hence a detailed description thereof will be omitted.

When the file management apparatus is powered on, the OS is activated. When a user then issues an instruction, a file management program (file registration processing program) in this embodiment is loaded from the hard disk drive 3 into the RAM 2 and executed (step S101).

Figure 6:
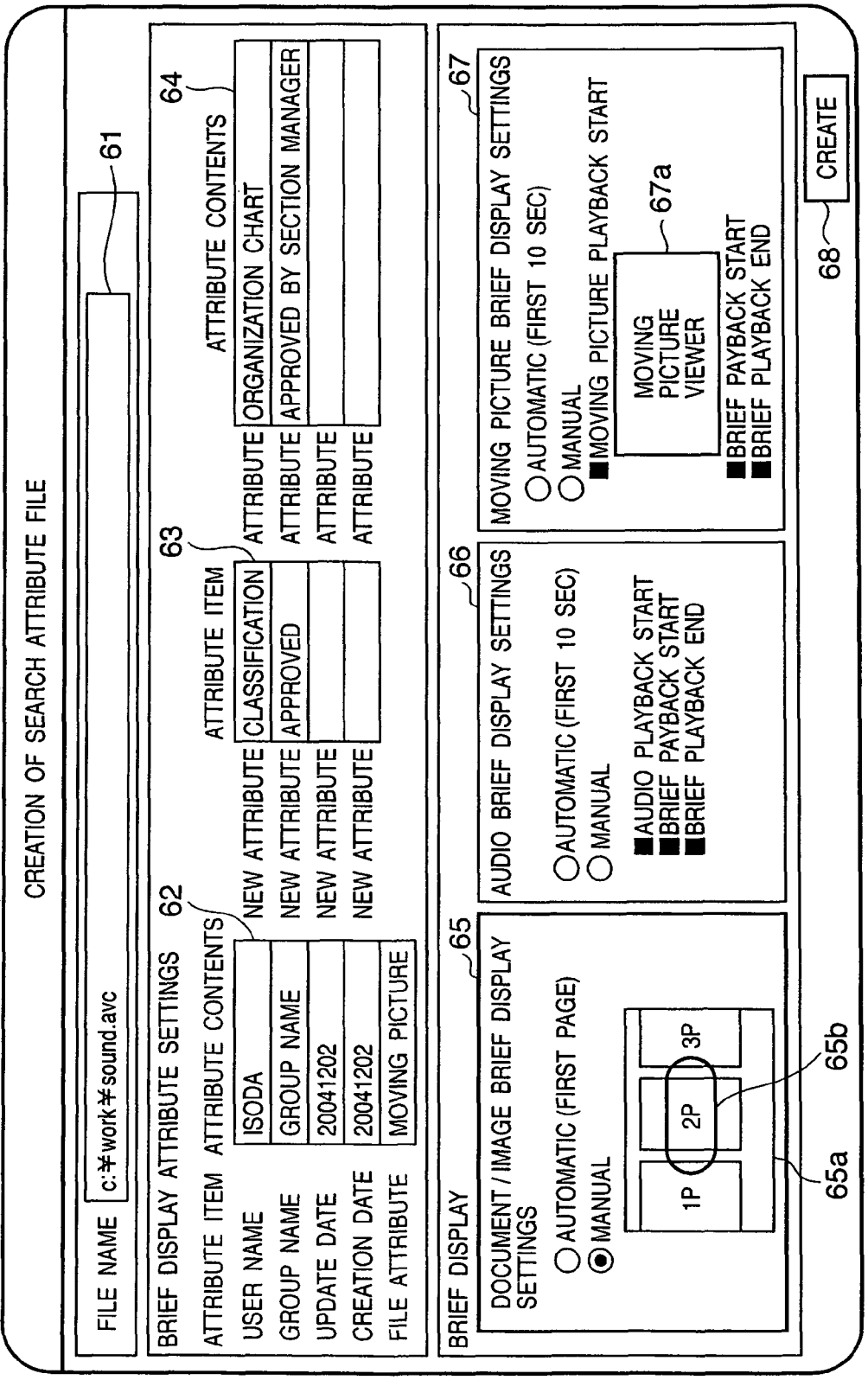
FIG. 6 is a view showing an example of a GUI for creating a brief display attribute file in the embodiment.

First of all, in order to create an attribute file for the brief display (the brief reproduction) of a file stored in the file server 6, a window for creating a brief display attribute file is displayed on the display device 5 by using the user command input device 4 (step S102). FIG. 6 shows an example of a window for creating a brief display attribute file.

The CPU watts for the user to input an access path to a target file (a file to be registered under the management of a file management program in this embodiment) for which a brief display attribute file is to be created and a character string representing its file name by using the user command input device 4. Such information is displayed in an input field 61 in the GUI on the display device 5 upon being input (step S103). Any method can be used to input an access path to a file and its file name. For example, the user may input each of characters representing a path and a file name by using a keyboard or the like, or may create character strings representing a drive name and a folder name designated so far by displaying a file browse dialog box or the like, tracing the drive and the folder with a pointing device, and designating a target file.

When the inputting of the path-attached file name of a target file is complete, an update date and creation date in a predefined attribute item field 62 and the name of a user who is creating the brief display attribute file and the group name of the user are displayed on the basis of the time stamp of the target file, user information set at the time of installation of this program, and the like (step S104). In this case, the attribute of the file is also determined by analyzing the extension or contents of the target file. Note that this predefined attribute item content is information stored by default. The user can edit this information by using the user command input device 4, as needed. In the case of a file containing both audio information and image information, the user can create an audio brief display attribute file by setting a file attribute which explicitly indicates that the file is an audio file, or can create an image brief display attribute file by designating a file attribute indicating that the file is an image file. With regard to audio playback output, to be precise, this file is designed to output "sound" instead of "display". In the description of this embodiment, however, this file will be written as a brief display attribute file (or brief playback information). In addition, since a user name item and a group name item are set, brief display (or brief playback) suitable for each user can be performed by designating the corresponding user name at the time of search to be described later.

In addition, the user uses the user command input device 4 to add a new user attribute item to be used to search a file of interest to an attribute item field 63, and to add an attribute content corresponding to the attribute item to an attribute content field 64 (step S105).

When the inputting of predefined attribute items and user attribute items are complete in the above manner, the flow advances to the processing in step S107 and subsequent steps.

In steps S107, S110, and S113, the attribute of a target file is determined.

If it is determined in step S107 that the target file is a document/image (still image) file, in order to perform document/image brief display, a frame 65 concerning document/image brief display settings is made thicker than other frames 66 and 67 to notify the user that operation can be performed, as shown in FIG. 6. According to the defaults, the first page is set as a page subjected to brief display. When the user selects "manual" by using the user command input device 4, each page of the target file is displayed in an area 65a. The user then selects a desired page and attaches a mark 65b to it (step S108). In the case shown in FIG. 6, three pages are displayed. Even if the target file has four or more pages, the user can designate a desired page from them by operating a scroll bar (not shown). In this case, the user is to perform designation on a page basis. However, the user may designate an area in a page.

When a page for brief display is designated, and the target file is a document file, the text data of the designated page is set as information to be briefly played back. If the target file is an image file, a thumbnail image of the designated page is set as information to be briefly played back. In step S109, an icon image is created from the designated page. This icon image may be created by bitmapping the designated page and performing reduction processing. In this manner, in making document/image brief display settings, brief playback information containing page information and an icon image-which are subjected to brief playback is created.

If the target file is an audio file, the flow advances from step S110 to step S111. In this case, the frame 66 is made thicker than the remaining frames to notify the user that settings can be made. In step S111, the user sets an interval in which audio data is to be briefly played back. The default is 10 sec from the start. If, however, the user designates "manual" and "audio playback start", playback of audio data is started. The user determines a start position of brief playback by designating "brief playback start". The user also determines an end position of brief playback by designating "brief playback end".

When an audio brief playback interval is set, an icon image which allows the user to easily understand that the target file is an audio file is created in step S112. This icon image may be selected from audio icons registered in advance. As described above, when the target file is an audio file, brief playback information containing audio information and an icon image which are subjected to brief playback is created.

If the target file is a moving picture file, the flow advances from step S113 to step S114. In this case, the frame 67 is made thicker than the remaining frames to notify the user that settings can be made. The user then sets an interval in which a moving picture is to be briefly played back (step S114). The default is 10 sec from the start. If, however, the user designates "manual" and "moving picture playback start", the moving picture is played back in an area 67a. In this case, while the moving picture is played back in the area 67a, the user determines a start position of brief playback by designating "brief playback start". The user also determines an end position of briefly playback by designating "brief playback end".

When the brief playback interval of the moving picture is set, an icon image which allows the user to easily understand that the target file is a moving picture file is created in step S115. This icon image may be selected from moving picture icons registered in advance, or may be created from the first frame when brief playback is performed. As described above, when the target file is a moving picture file, brief playback information containing moving picture information and an icon image which are subjected to brief playback is created.

If the target file is none of a document file, audio file, and moving picture file, the contents of brief display are created by a method suitable for the attribute of the file (step S116). An icon image suitable for the attribute of the file is then created (step S117). In this manner, even for a file with another attribute, brief playback information containing brief display information and icon image data is created. If, however, files other than document, image, audio, and moving picture files are not to be managed, errors may be determined. That is, the processing may be stopped upon regarding that such files cannot be processed under the management of this file management program.

When the brief playback information of the target file is determined in the above manner, the flow advances to step S118 to wait until the user presses (clicks) a creation button 68 through the user command input device 4.

When the creation button 68 is pressed, the flow advances to step S119 to convert an access path to the target file and its file name into a description in the XML format to be written in link file items. The flow advances to step S120 to convert the predefined attribute items and their contents (information in the field 62 in. FIG. 6) into data in the XML format.

Likewise, in step S121, the user attribute items (the field 63 in FIG. 6) and their contents (the field 64 in FIG. 6) are converted into data in the XML format. In steps S122 and S123, the icon image data, audio data, moving picture data, or the like contained in the brief playback information is converted into data in the XML format.

In the above manner, the attribute data described in the XML format in steps S120 and S121 and the brief playback information described in the XML format in steps 122 and S123 are combined to create an XML file with "emp" as an extension (step S124). The created file is stored as a search attribute file in a predetermined folder (step S125), and this processing is terminated. Note that the extension emp is merely an example, and the extension to be used is not limited to emp.

FIGS. 3A and 3B each show an example of a search attribute file in the XML format which is created by the above processing. FIG. 3A shows an example of a target file which is an audio file. The file name of a target file with a path is written between tags <link file> and </link file>. The tags and data of predefined attribute items and user attribute items are written between tags <attribute> and </attribute>. Image data to be used for icon display is presented between tags <window display> and </window display>. Audio data to be briefly played back (audio data in the interval set in step S111) is stored between tags <brief display data> and </brief display data>.

FIG. 3B shows an example of a target file which is a document file. This file structure is almost the same as that shown in FIG. 3A except that the text data of a page of the document which is designated by the user is stored between tags <brief display data> and </brief display data>.

Figure 7:
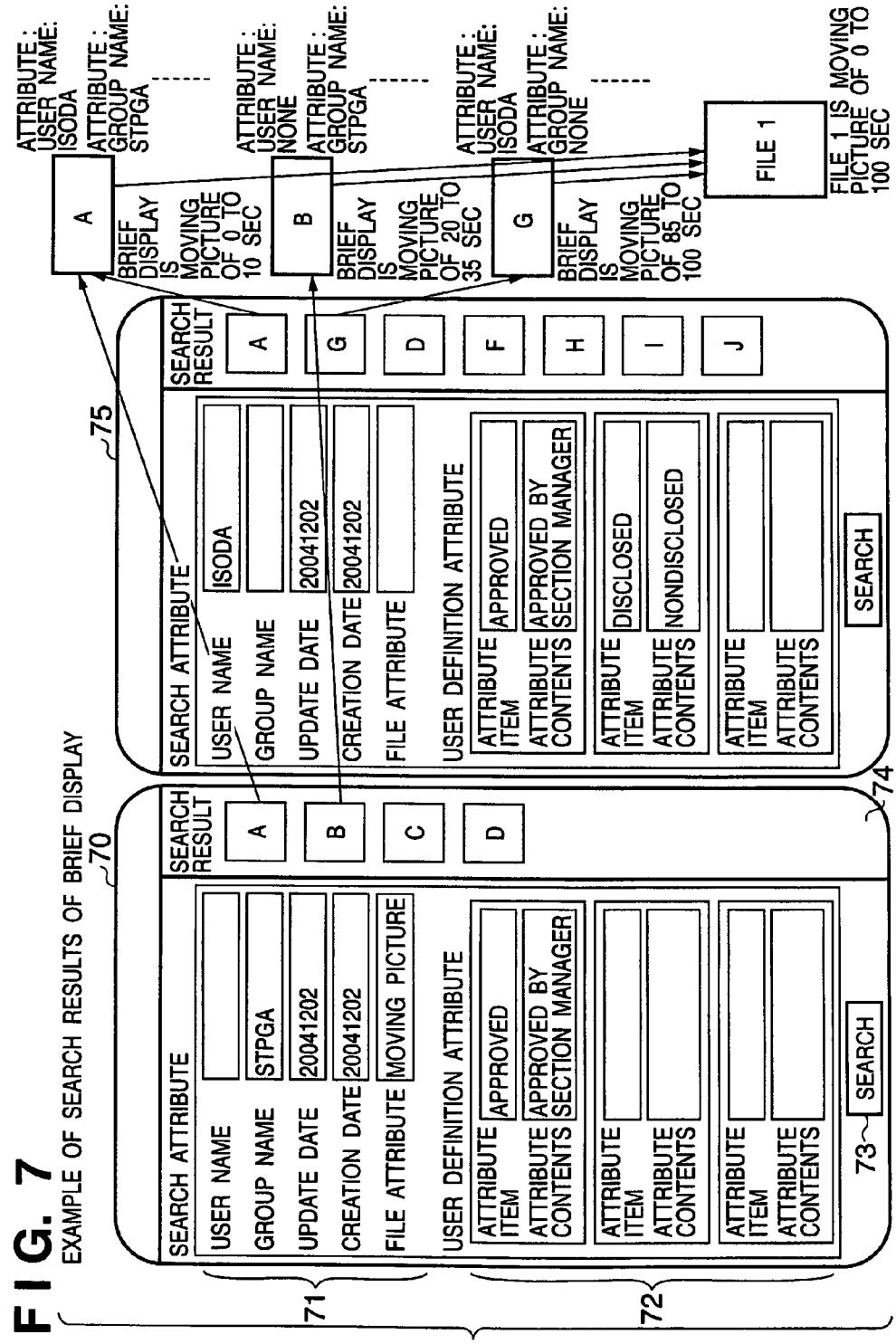
FIG. 7 is a view showing an example of a GUI of search results in the embodiment.

In the above manner, search attribute files managed by the file management program of this embodiment are sequentially registered. Search processing in the file management program in the embodiment will be described with reference to the flowchart of FIGS. 4A and 4B. FIG. 7 shows an example of a GUI according to brief playback search using brief display attributes.

First of all, a search window for brief display is displayed on the display device 5 in accordance with an instruction from the user command input device 4 (step S202). When the user wants to input a search key concerning a predefined attribute item, the content (search key) of the search attribute item is input in the corresponding input field in an area 71 by using the user command input device 4 (step S203).

If the user wants to input a search key concerning a user attribute item, an item name is input to "user attribute item" in an area 72, and its content (search key) is input as an attribute content (step S204).

Note that the user need not input data to all the predefined attribute items and user attribute items as search targets. It is just that blank fields do not become search keys.

Figure 5:
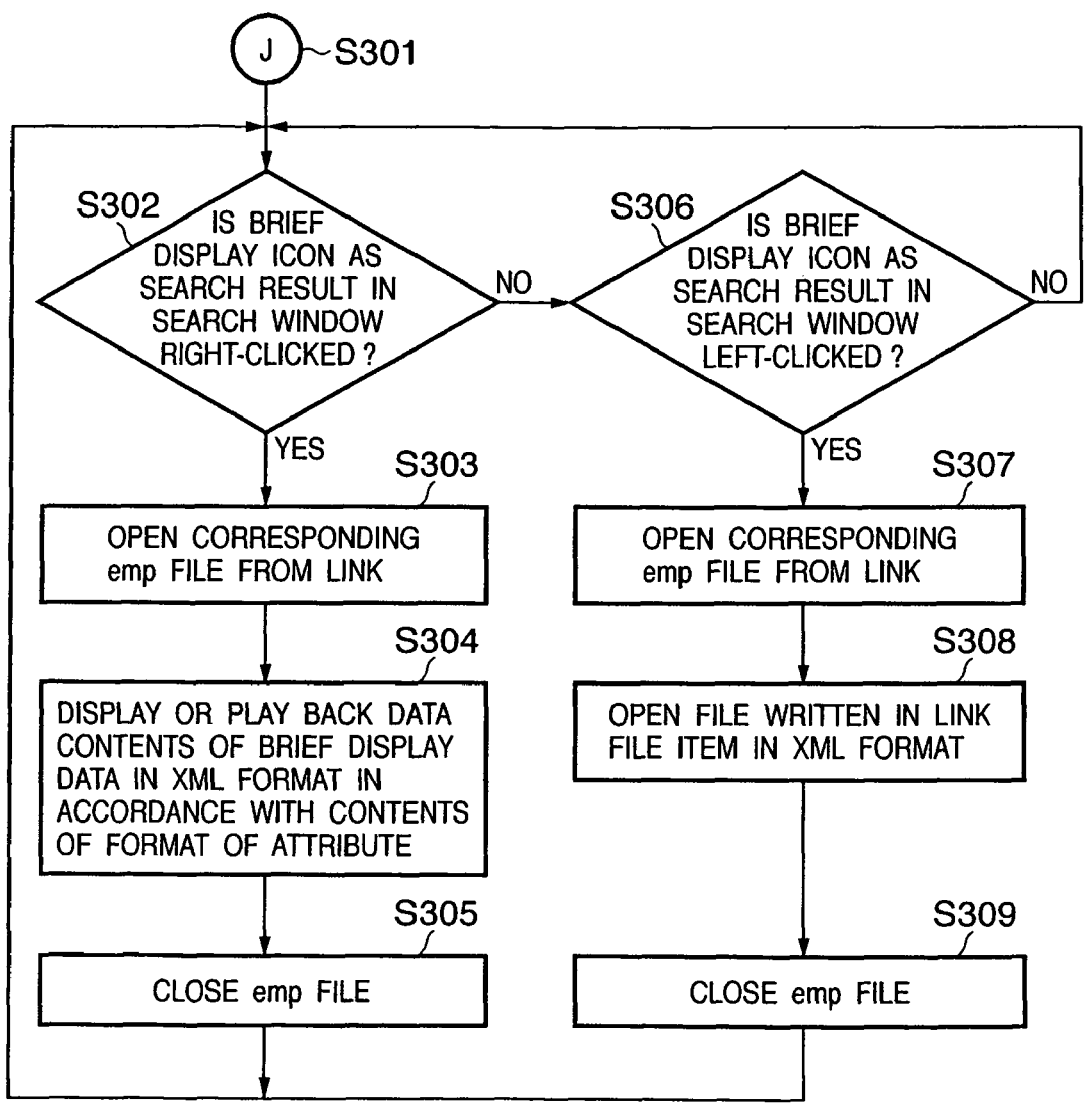
FIG. 5 is a flowchart showing playback processing for search results in the embodiment.

In step S205, the flow waits until a search button 73 is pressed with the user command input device 4. When the search button 73 is pressed, the flow advances to step S206 to initialize a file counter n to 1. Assume that N search attribute files (files with extension emp) as search targets exist in a predetermined folder. It is determined in step S207 whether there is any emp file which has not been searched. For example, this determination may be performed depending on whether n>N. If search processing for all emp files is terminated, the search processing is terminated, and the flow advances to step S208 (FIG. 5).

If there is an emp file which has not been searched, the nth emp file in a predetermined folder is opened in step S209. A predefined attribute item counter m is initialized to 1 (step S210).

In step S211, it is determined whether a search key has been input to the mth predefined attribute item in step S203. If no search key is input (blank), it is determined that search is not executed with the mth predefined attribute item. The flow then advances to step S213 to increment the predefined attribute item counter m by one. In step S214, it is determined whether the value of the predefined attribute item counter m is larger than a total count M of predefined attribute items. If NO in step S214, the flow returns to step S211.

If it is determined in step S211 that a search key has been input to the mth predefined attribute item in step S203, the flow advances to step S212 to determine whether the attribute content of the search key indicated by the predefined attribute item counter m matches the content of the mth predefined attribute item of the opened file. If NO in step S212, it is determined that the file of interest is not a search target. The flow then advances to step S222 to close the file of interest. In step S223, the file counter n is incremented by one. The flow then returns to step S207 to perform search processing for the next file.

If it is determined in step S212 that the content of the predefined attribute item of the file of interest matches the content input as the search key, the flow advances to step S213.

If YES is determined in step S214 as a result of the above operation, it indicates that the contents of the predefined attribute items in the file of interest match all the contents of the predefined attribute items input as the search keys.

In this case, the flow advances to step S215 to initialize a counter p to 1 so as to determine whether the input data of the user attribute item (the area 72 in FIG. 7) matches. In step S216, it is checked whether the pth user attribute item input as a search key item exists as an attribute item on the emp file. If NO in step S216, it is determined that the brief display information written in this XML file does not match the search condition. The flow then advances to step S222.

If the pth user attribute item input as a search key item exists in the file of interest, the contents of the two items are compared (step S217). If the contents (search keys) do not match, it is determined that the file of interest is not a target file, and the flow advances to step S222.

If it is determined in step S217 that the contents match, the counter p is incremented by one to check the next user predefined attribute item and its content (step S218). The counter p is then compared with a total count P of user attribute items input in step S204. If p≦P, the flow returns to the processing in step S216 to perform search processing for the user attribute item input next.

If it is determined that p>P, since all the items input as search keys match, the flow advances to step S220 to create an icon on the basis of the icon image data in the emp file of interest which is written between tags <window display> and </window display> and display the icon in a search result display area 74. In step S221, the link of the emp file is linked to the displayed icon. Subsequently, in order to close the file of interest, the nth emp file is closed (step S222). In order to check the next emp file, the file counter n is incremented by one, and the flow returns to step S207.

A search GUI 70 shown in FIG. 7 indicates that four files A, B, C, and D are found in a search result display area 74 as a result of the above operation. A search GUI 75 shown in FIG. 7 indicates a window to be displayed when search is performed with search keys different from those in the case of the GUI 70. This GUI indicates that seven files are searched as a result of the search operation.

Figure 8:
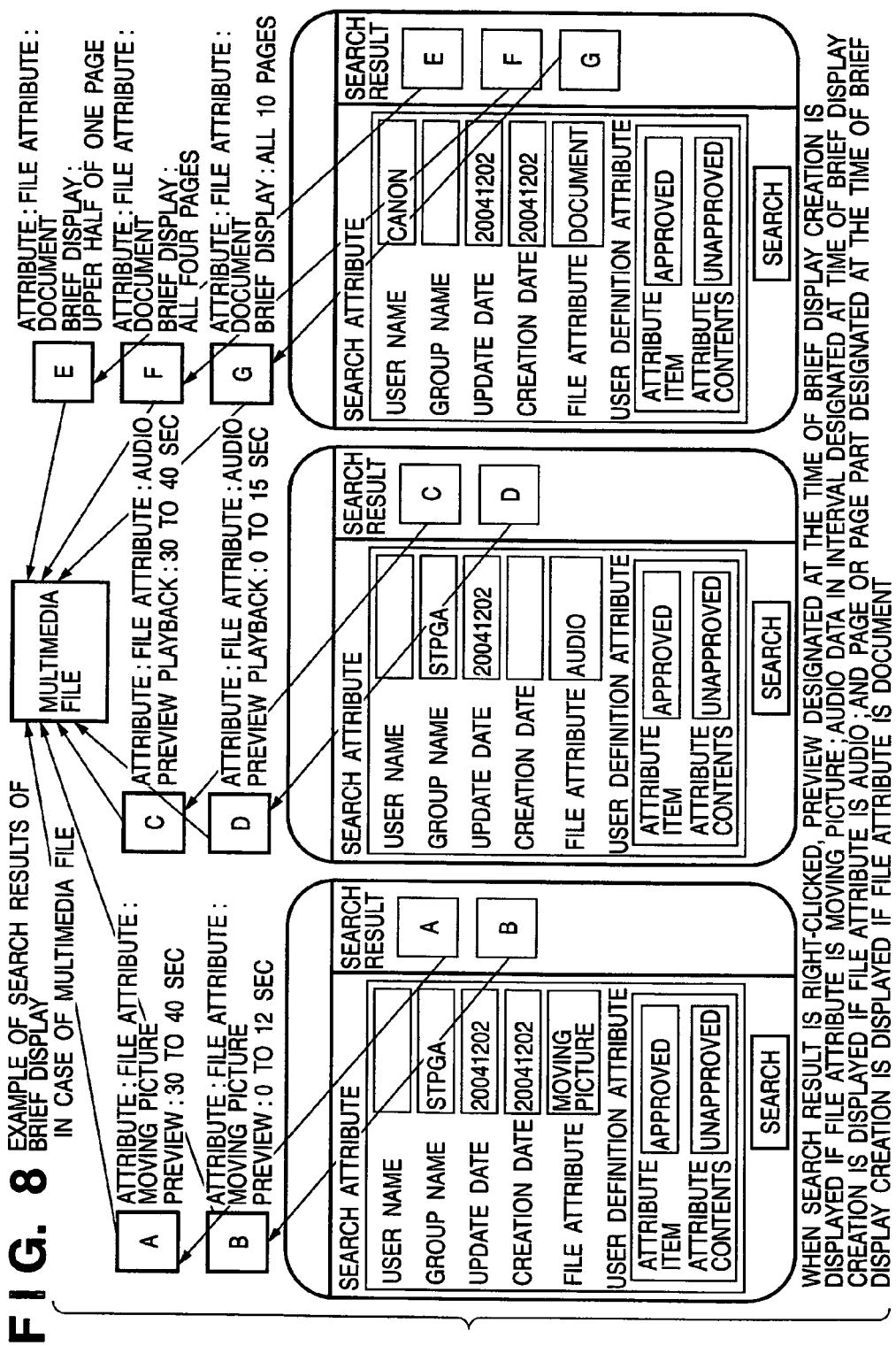
FIG. 8 is a view showing an example of the relationship between an example of a GUI of search results of brief display information of a multimedia file and the file in the embodiment.

FIG. 8 shows an example of the relationship between the results obtained by searching brief display information accompanying a multimedia file having moving picture data, document data, and audio data within one file with various search conditions, brief display, and the original file. In this case, with regard to one multimedia file, a plurality of moving picture, document, and audio emp files can be created and stored. Since a plurality of emp files can be created for one file, a plurality of different icons and different previews are displayed.

An example of how search results are used will be described next with reference to the flowchart of FIG. 5. This processing is processing (step S208) for a case wherein search of all emp files is complete in FIGS. 4A and 4B.

It is determined whether one of icons as brief display search results displayed in the search result display area 74 of the GUI on the display device 5 is right-clicked through the user command input device 4 (the operation of moving a cursor which operates in conjunction with a pointing device to a corresponding icon and pressing the right button provided on the pointing device) (step S302) or left-clicked (step S306).

If it is determined that the icon is right-clicked, the emp file linked to the designated icon is opened (step S303). The brief display data between XML tags <brief display data> and </brief display data> in the file is played back. If this data is a document or image, the data is displayed. If the data is audio or moving picture data, sound or video is played back. This allows the user to easily determine whether this brief display is that of a desired file. In step S305, the opened emp file is closed. The flow then returns to step S302.

If it is determined that the icon in the search result display area 74 of the GUI on the display device 5 is left-clicked, the flow advances from step S306 to step S307 to trace back the link and open a corresponding emp file (step S307). A file with a file name having a path between tags <link file> and </link file> in the opened file is opened (step S308). This allows the user to check the desired actual file. The flow then advances to step S309 to close the emp file. The flow then returns to step S302.

As described above, according to this embodiment, with regard to a multimedia file containing document/image, audio, and moving picture data and having a plurality of pages, the user can freely set icon images to be displayed and contents to be briefly played back. When the user performs predetermined operation, e.g., right-clicking an icon displayed as a result of search, set brief playback is performed, thereby allowing the user to check the contents of the image to some extent without opening the actual data. When right clicking is performed, the target file is opened. This makes it possible to perform processing such as browsing and editing the actual file.

Note that the present invention is not limited to a case wherein one brief display attribute file is created for one target file. As shown in FIG. 8, if a management target file is a multimedia file and contains audio, still image, text, and moving picture data, four brief display attribute files (emp files) may be created for the respective attributes. Alternatively, a plurality of different brief display attribute files may be creased by changing the values of predefined attribute items or user attribute items.

According to the above embodiment, a brief display attribute file containing attribute information, file link information, information for window display in an icon window, and brief display data is created for each target file. However, pieces of information of all target files may be stored in one brief display attribute file so as to be discriminated from each other.

In addition, according to the above embodiment, a user attribute can be input when search is performed. However, when search is started, information concerning the user who is performing the search may be set by default.

The above embodiment has exemplified the attribute search technique, the playback method for brief display using the search results, and the method of opening files.

Figure 9:
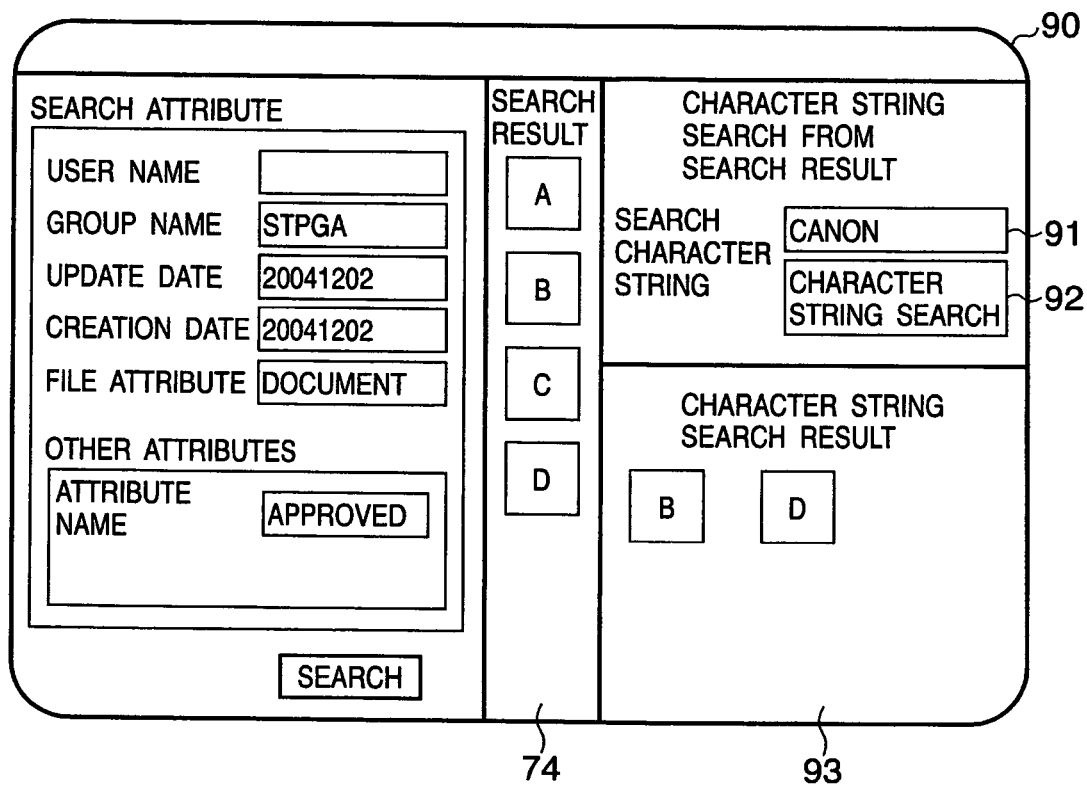
FIG. 9 is a view showing an example of a GUI of character string search using brief display in the present invention.

The details of search of a character string of document data stored in brief display data in a case wherein a target file written in a brief display attribute file is a document file will be described with reference to FIGS. 10A and 10B. With this operation, a desired document can be searched more easily by performing character string search such as full text search as well as performing attribute search concerning predefined attribute items and user attribute items. FIG. 9 shows an example of a GUI displayed on the display device 5 at this time.

Figure 10A:
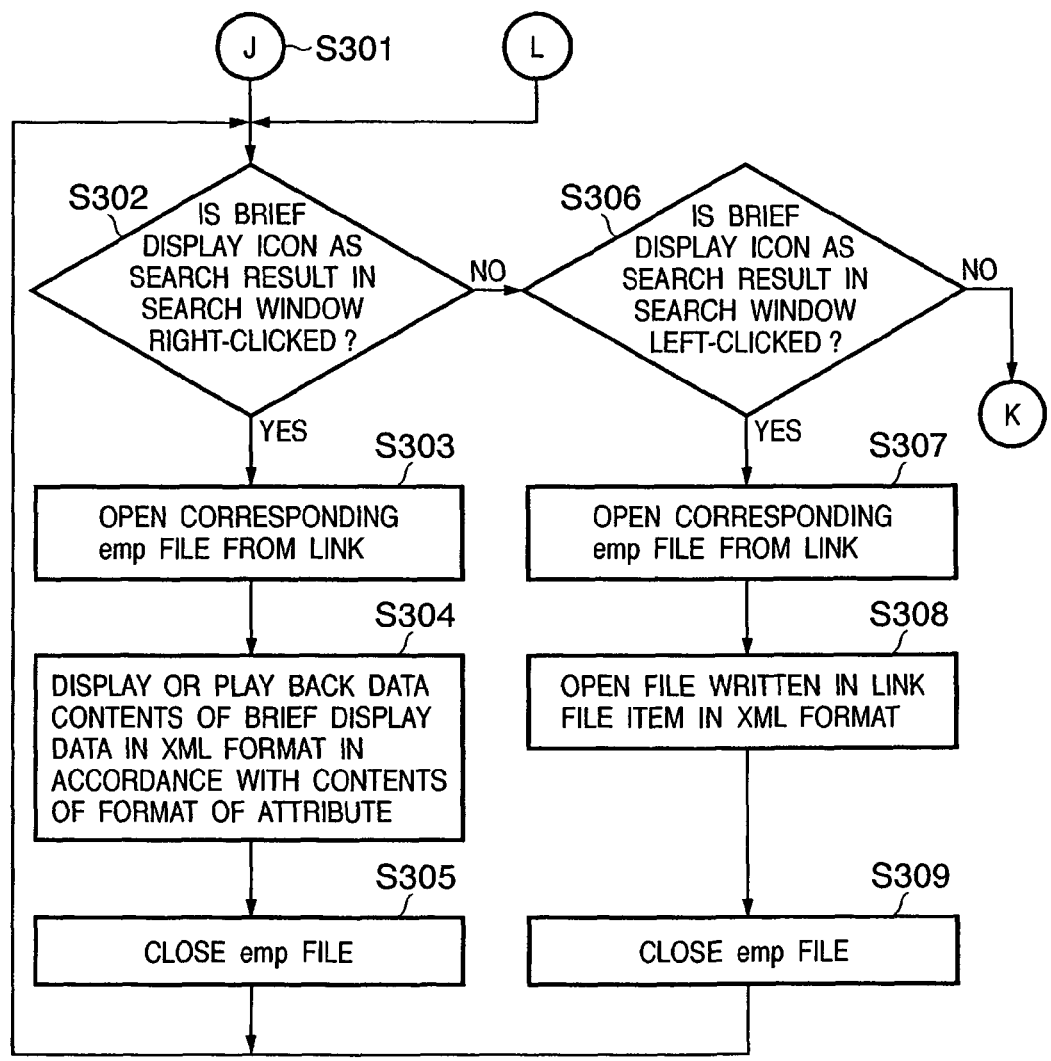
FIGS. 10A and 10B are flowcharts showing an example of a method for character string search of brief display in the present invention.
Figure 10B:
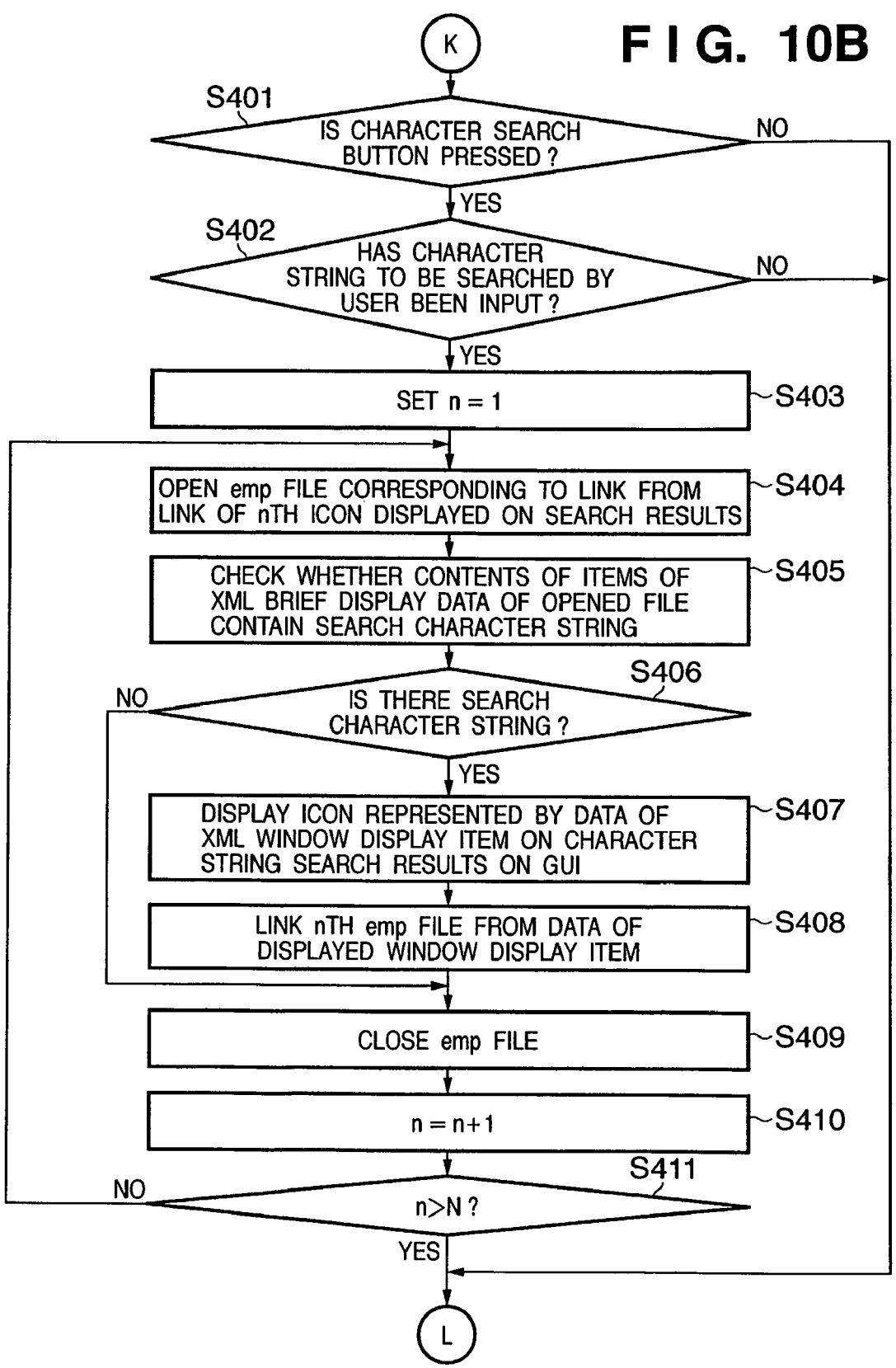

The processing up to step S309 in the flowchart of FIG. 10A is the same as that shown in FIG. 5 in the embodiment described above. The flowchart of FIG. 10B further includes processing after step S401 in which it is determined whether a character string search button 92 is clicked.

If it is determined in step S401 that the character string search button 92 is clicked, it is determined in step S402 whether a search target character string is input to an input area 91 through the user command input device 4. If NO in step S402, the flow returns to step S302.

If a search target character string is input and the character string search button 92 is clicked, the file counter n is initialized to 1 in step S403. An emp file corresponding to the link information of the nth icon displayed on the brief display search results is opened (step S404). It is then checked whether the character string between tags <brief display data> and </brief display data> of the opened emp file includes the same character string as the search target character string input to the input area 91 (step S405). It is determined in step S406 whether there is a character string which matches the input character string.

If NO in step S406, the flow advances to step S409 to close the emp file of interest. In step S410, the file counter n is incremented by one. If n≦N upon comparison with the total count N of icons displayed in the search result display area 74, the processing in step S404 and the subsequent steps is repeated.

If it is determined in step S406 that a character string matching the search target character string exists in the emp file of interest, the flow advances to step S407 to display an icon image of the corresponding file in a character string search result display area 93. In step S408, the emp file is linked to the displayed icon image. The processing in step S409 and the subsequent steps is then performed.

With the above operation, detailed information can be searched by character string search in addition to search results based on attribute items and their contents.

The above description has exemplified the case wherein search is performed by using a briefly displayed character string stored in a document. However, when a moving picture or audio file is to be processed, an audio data portion of brief display information may be parsed into a character string, and the character string may be stored as character string data in an emp file, thereby allowing character string search.

The embodiment of the present invention has been described above. Note the main characteristic feature of the present invention is realized by a computer program. In general, the computer program is stored in a computer-readable storage medium such as a CD-ROM, and the main characteristic feature can be implemented by setting the program in a computer and copying or installing the program in a system. It is therefore obvious that the computer-readable storage medium also falls within the scope of the present invention.

As has been described above, according to the present invention, a search attribute file corresponding to a management target file is created and stored. This search attribute is searched, and an icon image is displayed from the search attribute file. Brief playback information is played back as needed. Therefore, even an icon allows the user to play back desired information and check the contents of the file. In addition, the management target file can be opened in accordance with a predetermined instruction.

As many apparently widely different embodiments of the present invention can be made without departing from the spirit and scope thereof, it is to be understood that the invention is not limited to the specific embodiments thereof except as defined in the claims.

This application claims the benefit of Japanese Application No. 2005-172964, filed Jun. 13, 2005, which is hereby incorporated by reference herein in its entirety.

What is claimed is:

1. A file management apparatus which manages a plurality of management target files stored in a storage device, comprising:

storage means for storing a plurality of different pieces of search information used for search of the management target files in association with a plurality of different pieces of brief playback information for brief playbacks of the management target files, wherein said storage means stores, for one management target file, a plurality of different pieces of brief playback information which are created from different portions of the one management target file, and wherein each of the portions is designated by a user;

search means for searching the search information stored in said storage means on the basis of a desired search key; and playback means for playing back the brief playback information associated with the search information searched based on the search key by said search means, wherein when the plurality of pieces of search information are searched based on the search key by said search means, said playback means plays back the pieces of brief playback information respectively associated with the plurality of pieces of searched search information.

2. The apparatus according to claim 1, wherein said storage means stores, for each management target file, the plurality of different pieces of search information, the plurality of different pieces of brief playback information, location information indicating a location of the management target file, and icon image information created on the basis of the management target file, in association with each other, wherein said search means displays the search results as an icon list on the basis of icon image information associated with search information searched on the basis of the search key, wherein said playback means plays back brief playback information associated with both the search information searched based on the search key and an icon designated by a user in the displayed icon list, and wherein the apparatus further comprises file opening means for, upon inputting of an instruction to open an icon designated by the user in the displayed icon list, opening the management target file on the basis of the location information associated with the icon image information.

3. The apparatus according to claim 1, wherein each of the brief playback information is created from
text information of a page desired by the user if the management target file is a document file,
image information of a page desired by the user if the management target file is an image file,
audio information in an interval desired by the user if the management target file is an audio file, and
moving picture information in an interval desired by the user if the management target file is a moving picture file.

4. The apparatus according to claim 1, wherein the search information contains a predefined attribute item and a user attribute item arbitrarily set by the user.

5. The apparatus according to claim 1, further comprising character string search means for performing text search by using text information contained in the brief playback information.

6. The apparatus according to claim 1, wherein said storage means stores one of the plurality of different pieces of brief playback information and associated pieces of search information in association with each other by writing the search information and the associated brief playback information in an XML file.

7. A control method for a file management apparatus which manages a plurality of management target files stored in a storage device, comprising:
a storage step of storing a plurality of different pieces of search information used for search of the management target files in the storage device in association with a plurality of different pieces of brief playback information for brief playbacks of the management target files, wherein for one management target file, the storage step stores a plurality of different pieces of brief playback information which are created from different portions of the one management target file, and wherein each of the portions is designated by a user;
a search step of searching the search information stored in the storage device on the basis of a desired search key; and
a playback step of playing back the brief playback information associated with the search information searched based on the search key in the search step,
wherein when the plurality of pieces of search information are searched based on the search key in the search step, the playback step plays back the pieces of brief playback information respectively associated with the plurality of pieces of searched search information.

8. The method according to claim 7, wherein in the storage step, the plurality of pieces of search information, the plurality of pieces of brief playback information, location information indicating a location of the management target file, and icon image information created on the basis of the management target file are stored in the storage device in association with each other,
wherein in the search step, the search results are displayed as an icon list on the basis of icon image information associated with search information searched on the basis of the search key,
wherein in the playback step, brief playback information associated with both the search information searched based on the search key and an icon designated by a user in the displayed icon list is played back, and
wherein the method further comprises a file opening step of, upon inputting of an instruction to open an icon designated by the user in the displayed icon list, opening the management target file on the basis of the location information associated with the icon image information.

9. A computer-readable storage medium which stores a computer program for management of a plurality of management target files stored in a storage device, the program including program codes for causing a computer to execute:
a storage step of storing, for each management target file, a plurality of different pieces of search information used for search of the management target files in the storage device in association with a plurality of different pieces of brief playback information for brief playbacks of the management target files, wherein for one management target file, the storage step stores a plurality of different pieces of brief playback information which are created from different portions of the one management target file, and wherein each of the portions is designated by a user;
a search step of searching the search information stored in the storage device on the basis of a desired search key; and
a playback step of playing back the brief playback information associated with the search information searched based on the search key in the search step,
wherein when the plurality of pieces of search information are searched based on the search key in the search step, the playback step plays back the pieces of brief playback information respectively associated with the plurality of pieces of searched search information.

10. The storage medium according to claim 9, wherein in the storage step, the plurality of pieces of search information, the plurality of pieces of brief playback information, location information indicating a location of the management target file, and icon image information created on the basis of the management target file are stored in the storage device in association with each other,
wherein in the search step, the search results are displayed as an icon list on the basis of icon image information associated with search information searched on the basis of the search key,
wherein in the playback step, brief playback information associated with both the search information searched based on the search key and an icon designated by a user in the displayed icon list is played back, and
wherein the program further includes a program code for causing the computer to execute a file opening step of, upon inputting of an instruction to open an icon designated by the user in the displayed icon list, opening the management target file on the basis of the location information associated with the icon image information.

* * * * *